US011106038B2

(12) United States Patent
Roggatz

(10) Patent No.: US 11,106,038 B2
(45) Date of Patent: Aug. 31, 2021

(54) AUGMENTED REALITY (AR) GLASSES AND METHOD FOR MIXING VIRTUAL IMAGES INTO AN IMAGE VISIBLE TO A WEARER OF THE GLASSES THROUGH AT LEAST ONE GLASSES LENS

(71) Applicant: Konstantin Roggatz, Puls (DE)

(72) Inventor: Konstantin Roggatz, Puls (DE)

( * ) Notice: Subject to any disclaimer, the term of this patent is extended or adjusted under 35 U.S.C. 154(b) by 74 days.

(21) Appl. No.: 16/500,783

(22) PCT Filed: Mar. 29, 2018

(86) PCT No.: PCT/EP2018/000140
§ 371 (c)(1),
(2) Date: Feb. 12, 2020

(87) PCT Pub. No.: WO2018/184718
PCT Pub. Date: Oct. 11, 2018

(65) Prior Publication Data
US 2020/0209627 A1 Jul. 2, 2020

(30) Foreign Application Priority Data
Apr. 6, 2017 (DE) ..................... 10 2017 003 336.6

(51) Int. Cl.
*G02B 27/01* (2006.01)
*G02B 27/09* (2006.01)
(Continued)

(52) U.S. Cl.
CPC ..... *G02B 27/0172* (2013.01); *G02B 27/0977* (2013.01); *G06T 19/006* (2013.01); *H04N 9/3152* (2013.01); *G02B 2027/0178* (2013.01)

(58) Field of Classification Search
None
See application file for complete search history.

(56) References Cited

U.S. PATENT DOCUMENTS

2011/0227487 A1 9/2011 Nichol
2014/0003762 A1* 1/2014 Macnamara ............ G02F 1/011
385/8
(Continued)

OTHER PUBLICATIONS

International Search Report of PCT/EP2018/000140, dated Aug. 13, 2018.

*Primary Examiner* — Christopher J Kohlman
(74) *Attorney, Agent, or Firm* — Lempia Summerfield Katz LLC

(57) ABSTRACT

The invention relates to a minimalistic pair of AR glasses having very high resolution, any field of view, total transparency, continuously variable object focal length, minimal eye lights and a projector unit behind the ear without any socially harmful indications of technology around the user's face. An integral image grid is constructed in a rimless pair of glasses, wherein, using multimode glass fiber projectors and MEMS switch rods the individual images are delivered directly before the eye by means of gradient-index camouflaged-optical-unit tubes, preferably by means of a combination of multimode glass fiber projectors for indiscernibly supplying high-resolution holographic projections, an integral imaging concept for resolution of any level and any field of view, fast SLM DMD chips for huge image-generation throughput, a gradient-index camouflaged optical unit for perfectly concealed hardware in rimless glasses lenses, and an eye-tracking-controlled adaptive resolution controller for producing huge virtual resolutions.

14 Claims, 5 Drawing Sheets

Figure 1:
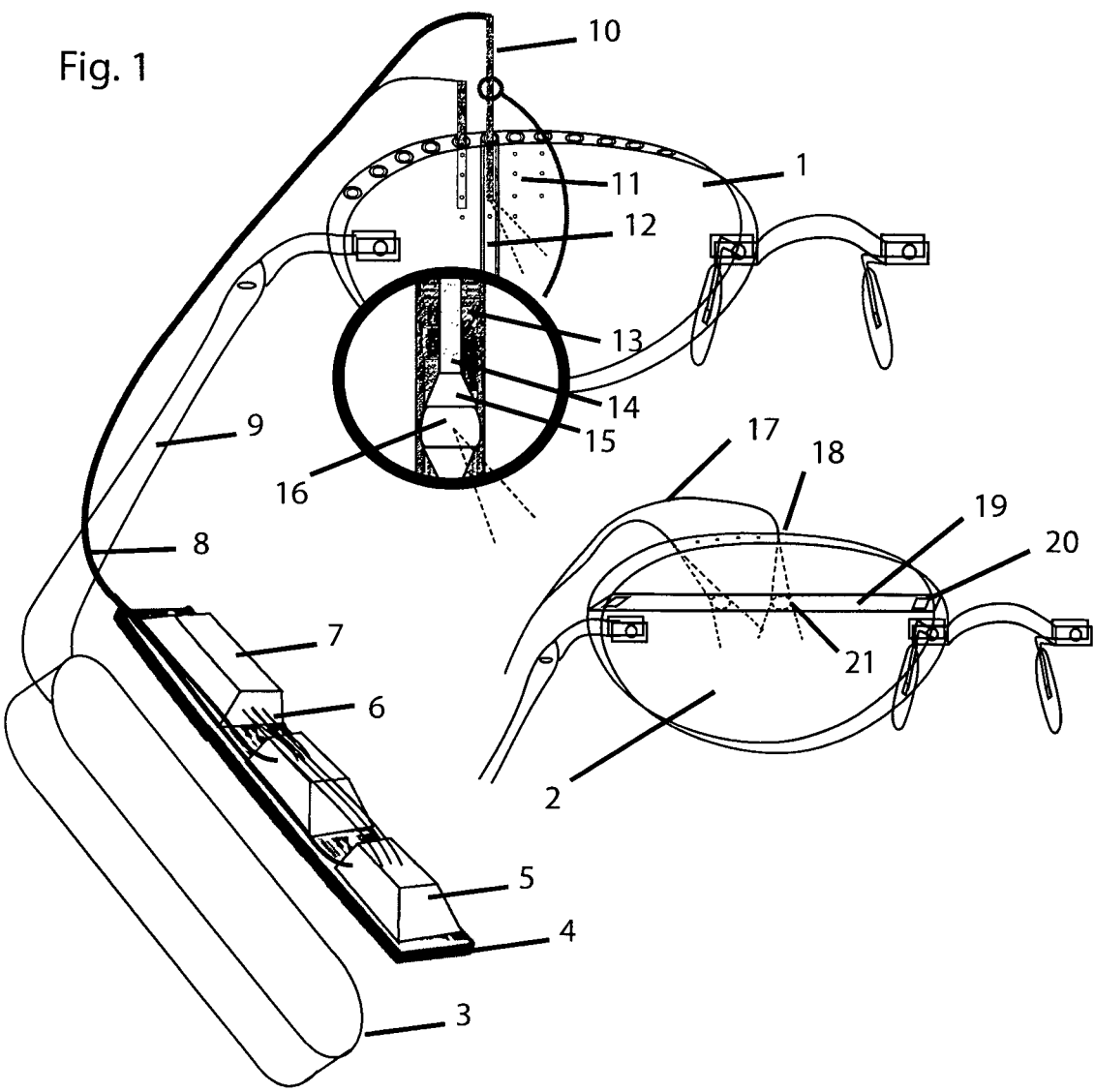

(51) Int. Cl.
    *G06T 19/00*     (2011.01)
    *H04N 9/31*     (2006.01)

(56) References Cited

U.S. PATENT DOCUMENTS

| | | | |
|---|---|---|---|
| 2014/0071406 A1* | 3/2014 | Manni | G03B 21/2033 |
| | | | 353/31 |
| 2015/0015879 A1* | 1/2015 | Papadopoulos | G02B 6/0288 |
| | | | 356/301 |
| 2016/0363735 A1* | 12/2016 | Reece | G02B 26/06 |
| 2018/0053284 A1* | 2/2018 | Rodriguez | G06F 3/14 |
| 2019/0293939 A1* | 9/2019 | Sluka | G02B 27/0075 |

* cited by examiner

AUGMENTED REALITY (AR) GLASSES AND METHOD FOR MIXING VIRTUAL IMAGES INTO AN IMAGE VISIBLE TO A WEARER OF THE GLASSES THROUGH AT LEAST ONE GLASSES LENS

CROSS-REFERENCE TO RELATED APPLICATIONS

This application is a PCT National Phase application based on PCT Application No. PCT/EP2018/000140, filed on Oct. 11, 2018, which is incorporated herein by reference in its entirety.

FIELD OF APPLICATION

The invention relates to AR (augmented reality) spectacles that are transparent like normal spectacles, but can additionally superimpose virtual objects or images in a highly resolved manner into the real image that is visible through the spectacle glasses. Specifically the invention relates to AR spectacles, which, by the placement of a plurality of optical fiber ends directly in front of the pupil of the spectacle wearer, project a resolution dynamic light field into the pupil, wherein the optical fiber feed lines by means of an optical camouflage device are routed through the glass in a manner invisible from the outside and can be distributed by optical switches, and wherein behind the ear or head of the spectacle wearer, SLM processors, transmission matrix transformed images are coupled into the optical fibers, so that the optical fiber ends in front of the pupil emit a perfect partial image.

PRIOR ART

Various systems are known, how AR spectacles are functionally constructed. In this case, a rough distinction is made between the older approach of back-reflecting a small display through the spectacle glass or in a prism. This approach makes the frame for this display excessively large or the visible section very small, and is not further treated here (e.g. Google Glass or Meta 2). A further more recent approach is the use of flat waveguides that allow the image to exit from a screen by means of diffraction gratings. However, this technique offers only a very restricted viewing angle and poor visibility (e.g. Hololens or Magic Leap). Some newer approaches, which are not yet realized, generate a light field of a plurality of partial sections of the overall image which are arranged in a grid pattern. These partial images (as in some patented approaches by Magic Leap) are projected by means of a grid of fast-switching mirror prisms (optical gates) or by means of diffraction gratings (waveguide with embedded diffraction grating) from the lateral side into the spectacle glass and then into the eye. It has also been proposed by Magic Leap to use an oscillating mono-mode optical fiber as a particularly small image projector. Another system (Pinlight Display from UNC) deflects a wave front by means of an SLM (Spatial Light Modulator) onto a grid of roughened points on the spectacle glass. When viewed from close proximity the roughened points then work like the screen of a light field segment, but are illuminated from the outside.

3D monitors are known which, by means of eye tracking, project to the observer a computer generated hologram into the direction of the eyes. Also with the aid of SLMs, sub-holograms are a generated, which are then integrated into a total hologram.

DISADVANTAGES OF THE PRIOR ART

The designs presented until now are far away from looking like commercially available spectacles having the smallest possible frame. However, the market experience of Google Glass clearly confirms, that even the smallest anomaly compared to normal spectacles will pose a problem with the market acceptance when the spectacles are to be used every day. The individual facial expression and eye contact are usually too socially sensitive to blemish them by a futuristic technique. In addition, the spectacles are poorly pixel-resolved, have a limited transparency, do not focus like real objects, offer only a restricted field of view and project a lot of light into the eyes.

ADVANTAGES AND OBJECT OF THE INVENTION

The advantages and objectives of the invention are to use the most minimalistic frameless spectacles (1) having a nose bridge and side arms fastened directly to the glasses as a model and to integrate therein an almost invisible optical system (10), which projects into the eyes a highly resolved integral light field that is not visible from the outside (at least 20K) (48). The extent of the light field is limited only by the field of view of the spectacles, so that in the case of a corresponding spectacle design even a viewing field of 220 degrees is possible. The glasses apply a LCD darkening layer at the front. In addition, at least 2 video cameras directed to the eyes and 2 video cameras directed into the field of view are accommodated (53).

The glasses can also be designed as normal optician glasses. Any technique that appears somewhat more bulky can be accommodated in a portable unit (3) or at the end of the ear pieces behind the ear and the head. If necessary, the image of the projected light field can provide for each object in view the adjusted focus, in order to simulate the eye-vergence-focus relationship, and can additionally display the focused objects in the highest possible retina resolution without having to turn the head. The patent shows that the construction of "main stream" spectacles is absolutely possible. However, this also entails the paradigm change towards "open source" operating systems, which will come up against the AR data privacy nightmares with the block-chain constructions of absolute trust, and will make the AR spectacles the ultimate blockchain application.

SEARCH KEYWORDS

Pinhole Projector, Integral Imaging, Optical Cloaking Device, Multi-mode Fiber Endoscope, Computer-Generated Holography CGH, Foveated Rendering, Vergence Accommodation Conflict, Time Domain Imaging, Amplitude and Phase Complex Modulating SLM, Magic Leap, Hololens, SLM, DMD, DLP, FLCOS, Augmented Reality AR, Mixed Reality MR, Matrix Optics, Speckles Reduction, Piezo FTIR, Electrochromic Mirror, Pinhole Spectacles.

LISTING OF THE DRAWINGS

Figure 2:
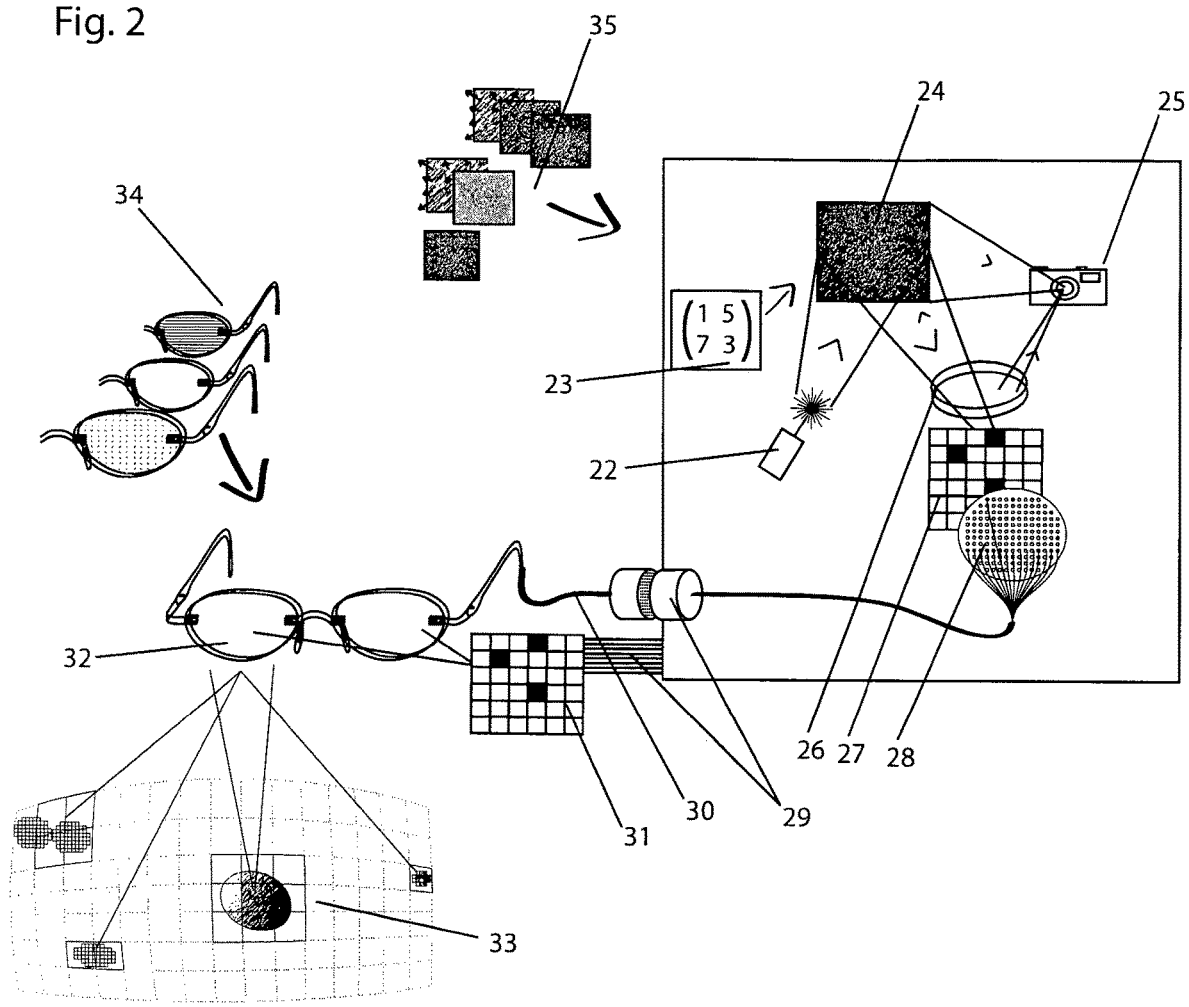
Figure 3:
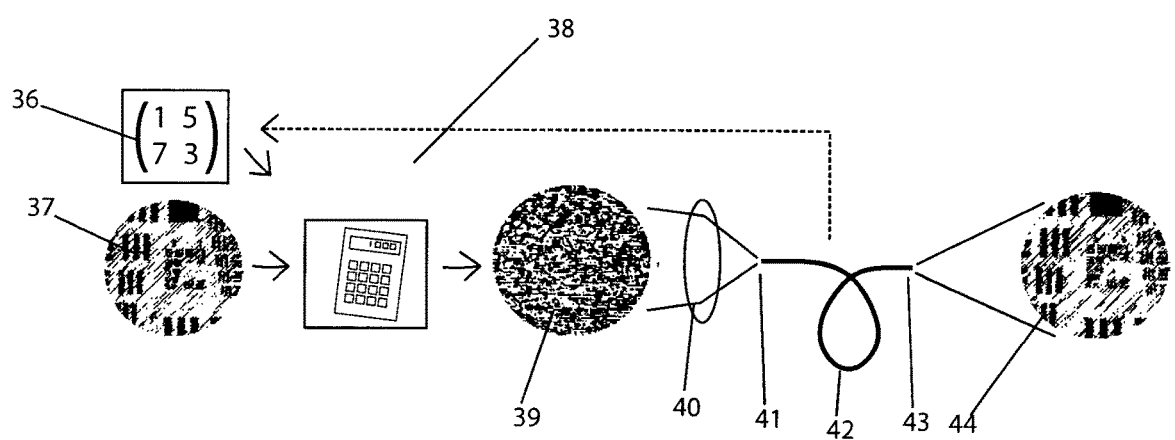
Figure 4:
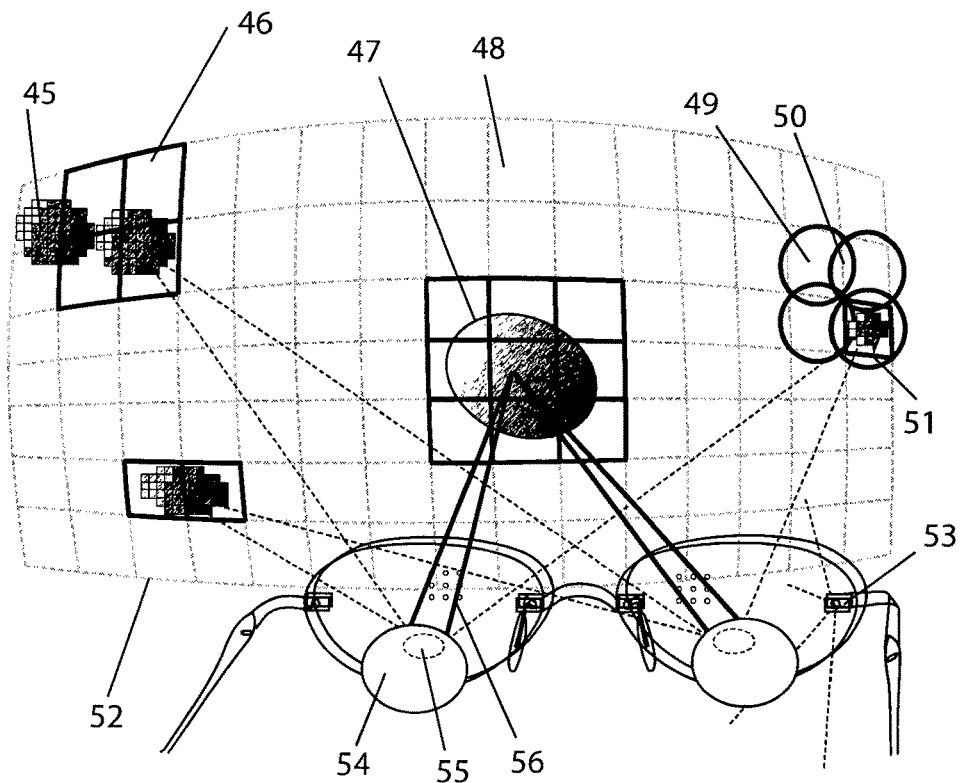
Figure 5:
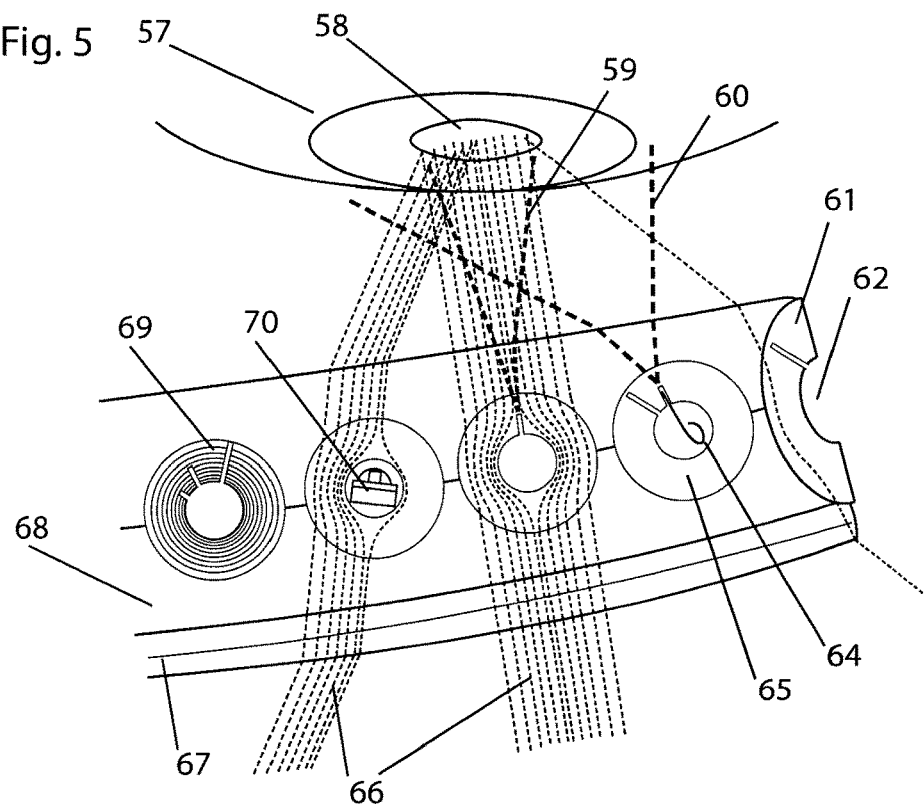
Figure 6:
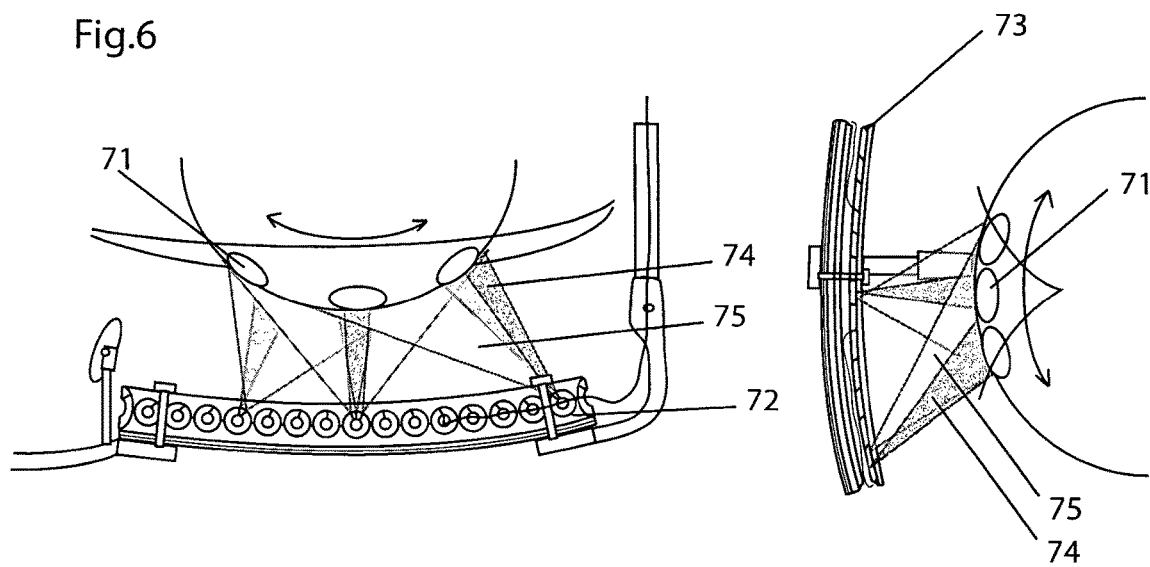
Figure 7:
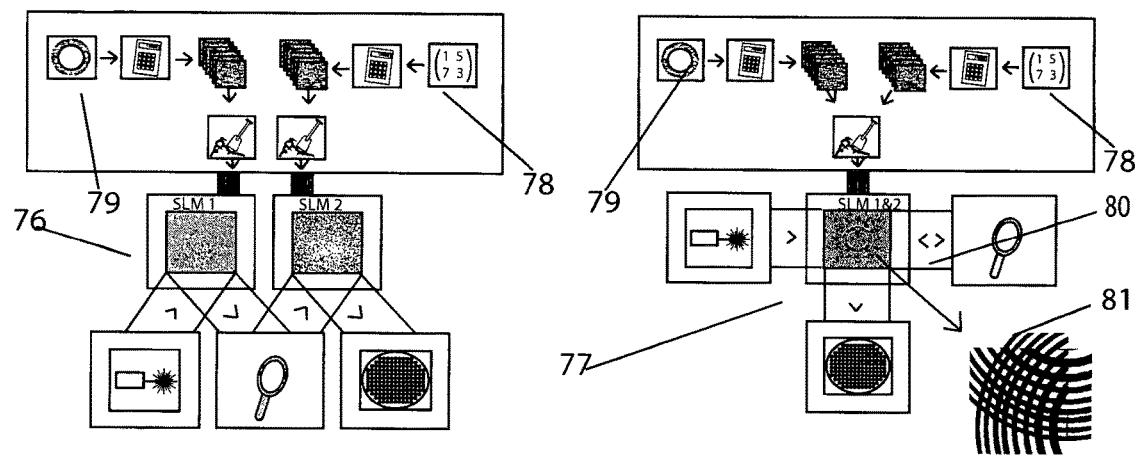
Figure 8:
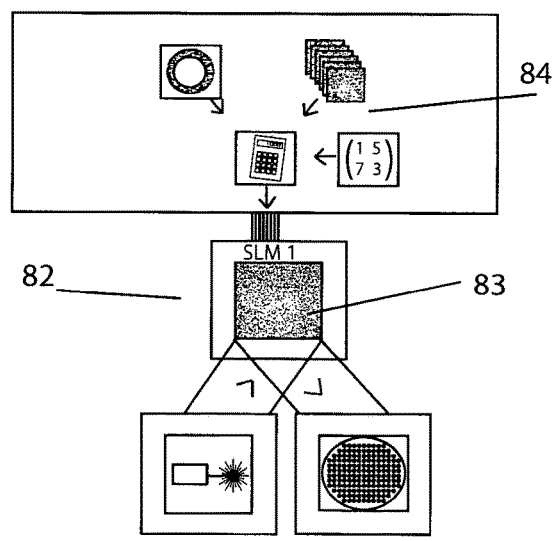
Figure 9:
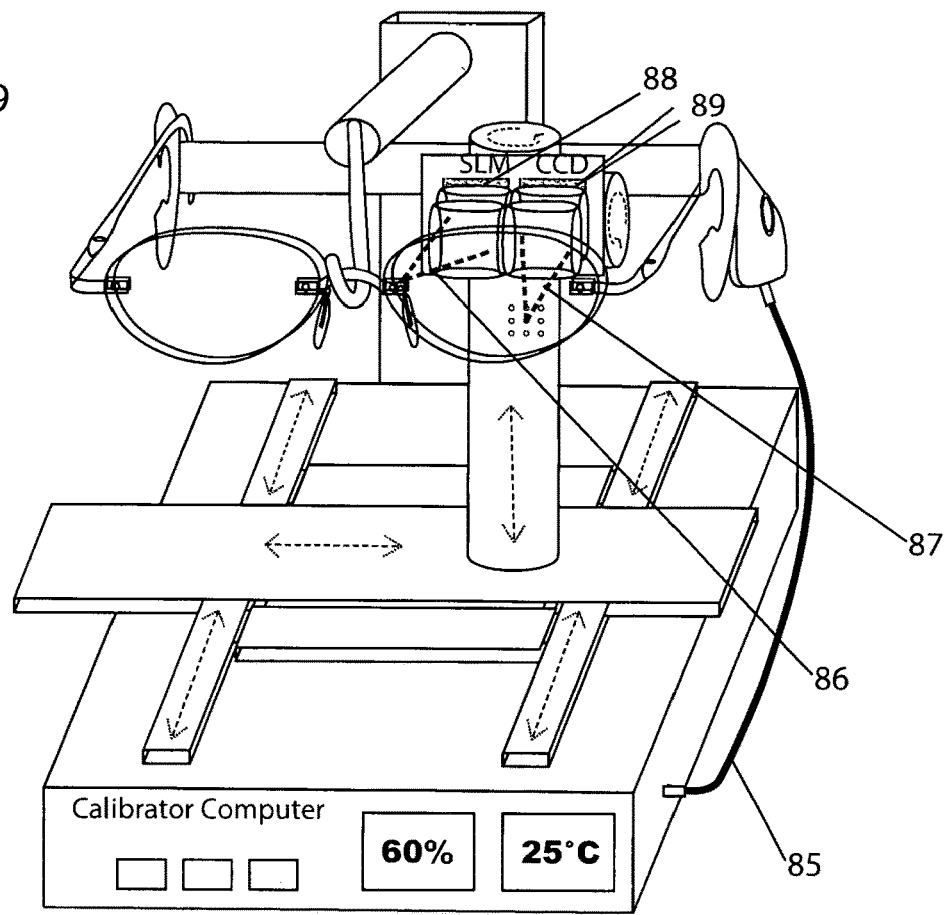
Figure 10:
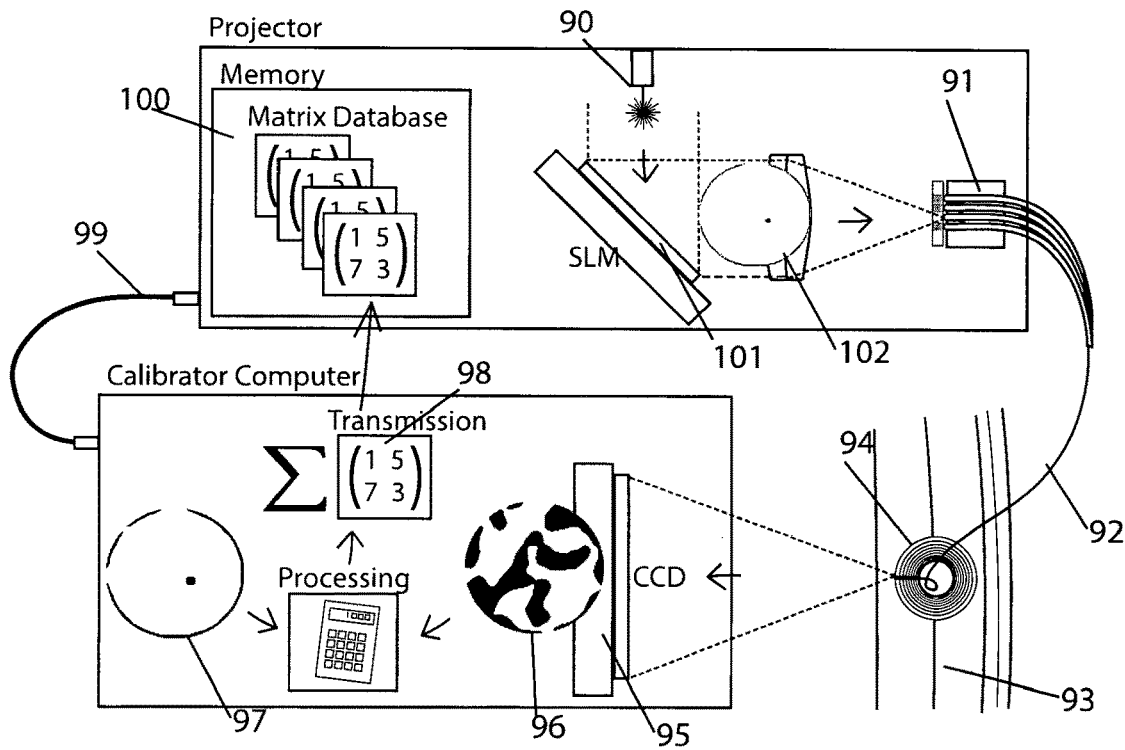

In the following the invention is explained in more detail with regard to several embodiments, which are depicted in the drawings that show:

FIG. 1 an AR spectacles overview with Micro Electro-Mechanical Systems (MEMS) technology or switching mirrors FIG. 2 a concept view of the overall system FIG. 3 a concept view of a multimode optical fiber projector FIG. 4 an AR spectacles resolution dynamic integral image FIG. 5 gradient optical cloaking channels in the spectacle glass FIG. 6 projection planes for focus and ambient in the spectacle glass FIG. 7 concept view dual-stage projector FIG. 8 concept view single-stage projector FIG. 9 AR spectacles calibration machine FIG. 10 concept view transmission pattern measurement

DETAILED DESCRIPTION

As illustrated in the drawing, for the AR spectacles at least 300 optical fiber projection points (48) are each fed with a low-resolution partial image (51) in a hologram projector (3) that is positioned at the back of the head and consists of a plurality of SLM light processors. The input optical fibers are routed at will through the eyeglass side arm (9) and the spectacle rim (62) for projection at the spectacles. As a result, there are various approaches (34) as to how the projections can get in a grid directly in front of the eye, in order to thus project a multitude of partial images or holograms directly into the pupils. The line variant (2) positions the projection points at the spectacle rim, and uses rapidly switchable mirror surfaces (19) within the glass. The preferred point variant, as described here, uses a gradient index optical cloaking system (12, 69). For this purpose, the optical fibers in the spectacle glass are routed through a small optical cloaking tube (12) so that the fibers, or final MEMS switch systems (10, 70) attached thereto, are invisible in the glass from all sides (66). The light guides can thus project in the glass directly in front of the eyes in a grid into the eye.

From the point of view of the spectacle wearer, the individual projections merge into a high-resolution overall image (48) filling the field of view. The 3D impression already results from the stereoscopic separation of the projectors by the right and the left glass. Nevertheless, a holographic image can be provided for each eye, onto which image the eye can focus smoothly from far to very close. Only in this way in interaction with the dynamic calculation of the 3D images according to the movements of the head (gyroscopic sensors), and the superimposition of the corresponding darkening-LCD mask (31, 67), a perfect holographic image will be mixed into the reality. Due to the very small optical fiber projection points, they even provide an image with a particularly high depth of field, so that the projector has to adjust the focus only in the case of very close objects. In this way, the spectacle glass also is in no way less transparent because of optics than normal spectacles (66). In a reverse manner, some fibers are also used in parallel or exclusively as a camera (25, 53). For each optical fiber, a processor or computer transforms the image section according to the individual transmission matrix (23, 36), which has been measured before during the calibration (87) for each fiber (92) and each point (102). An SLM (Spatial Light Modulator) (24) then generates a light front (39), which does not only couple the precise light intensity distribution but also the phase shift distribution into the optical fiber (41). Only by means of this light front conversion, including the phase distribution, a single multimode optical fiber (42) can be used for a basic color respectively as the light channel and the projector (44). Various methods are described for projecting the images, that are using only one SLM (83), or a plurality of SLMs (76, 77) in series in order to save on computing time (78, 79). One method consistently focuses on computer-generated holograms as well as effective holographic gray scale generation (holo projector). A second method consistently focuses on the computational use of the different matrices for transmission and focusing (matrix projector), and requires particularly optimized SLMs with special illumination in order to generate the phase shifts. AR applications typically display only a few objects within the wide field of view (46). The projector dynamically controls only those optical fiber projectors where objects are located. By tracking the eye (eye tracking) (53), additionally only those projectors (47), which are focused at the moment, are addressed at a higher resolution. Thus, most of the projection points are given only a low resolution (45), because in any case the human visual perception does not perceive the surroundings in a highly resolved manner Due to the strong eyeball movements (71) at least two parallel integral imaging grid planes for focus and ambient projections are used, which, by different projection angles (74, 75) allow for different pixel densities, and are tailored exactly to the pupil in order not to obtain any disturbing eye illumination. Only due to this massive resolution and work load reduction, and due to the massive use of pre-calculated modular diffraction patterns or image patterns, it is possible with the fastest SLM light processors and parallel graphics processors to realize already today the imaging process. By means of a whole series of methods, especially by means of slightly incoherent laser light in the projection, the disturbing speckle effect is filtered out.

By means of MEMS optical fiber switches (10) in the small camouflage tubes, the number of optical fiber strands (8) is reduced, whereby the thickness and the resolution of the optical fibers are increased. Technical optimizations are carried out on the SLM chips, which enables an optimum hologram or matrix projection for AR spectacles. Through the illumination of the SLM chips by means of a plurality of different light sources, or entire illumination holograms, and by means of DMD mirrors that can be tilted in a plurality of directions, the projections for the individual coupling-in point can be greatly optimized. Grey levels can thus be generated within a single imaging cycle for the extremely fast SLM light processors. Then the 24000 to 32000 cycles per second of the DMD chips, can build up, for each individual projection of the integral light field per eye (e.g. 150) and for each RGB color component and at an image rate of 60 Hz, the complete image for consecutive display in a time domain. In practice, however, for normal AR applications only a much smaller image area is used. For further details and variants of the technology, reference is made to German Patent Application No. 10 201 7 003 336. 6, the contents whereof are incorporated by reference into the present patent application.

PV Point Variant (11)

This variant got its name based on the tiny optical fiber tips, which project just that far out of the optical camouflage so that they actually only show a vague shadow. If the optical fiber tip is fully moved into the camouflage area, it can no longer be seen at all. The charm of this variant is the effect of the image appearing downright from nothing in the glass which is perceived as magical. Technically, this variant is particularly attractive because it can fully exploit the possibilities and degrees of freedom that are presented.

Cloaking effect: The technical basis here is the cloaking effect (66) which allows a thin cavity (64) to be rendered optically invisible in a dense optical medium (68). This is achieved by ring like layers having a sharply dropping refractive index (69) around the cavity, wherein the surrounding optical medium has to start with a comparatively high refractive index (at least 1.7) and the last layer at the cloaked region has only a minimum refractive index (at most 1.5). In this case, the light beams are guided perfectly around the cavity (66). Because humans always interpret light as straight, the cavity is not perceived. A perfect camouflage body is a corresponding tube (12), but also more complex spaces, such as an oval, are perfectly camouflaged from all sides.

A particular large number of optical fibers: For the point variant a large number of optical fibers is routed around the spectacle rim and is distributed to a grid of projection points that end directly within the spectacle glass (11). In order to get into the interior of the glass, several camouflage tubes are routed through the glass next to one another (12). The optical fibers are threaded into the glass tubes and are bent within the camouflage tube (64) at a radius of curvature of about 1-2 mm and then, through a hole in the tube, point exactly in the direction of the pupil (60). At their end the optical fibers have an optical system, which, in combination with the properties of the camouflage tube, emit a projection cone in the direction of the pupil. This system permits to emit the fiber projections exactly in the desired direction (59).

Through the principle of the near light-field projection the dense grid of projectors will become an integral image (48). By means of the technique of projection trimming (50, 51), a perfectly assembled image will then be generated from the overlapping images.

Curved tube and rim: The camouflage tubes are formed into a curved shape in order to follow the curvature of the spectacle glass. In order to likewise camouflage a routing channel around the glass, the same technique is applied with a camouflage half shell (61).

The attachment of the ear pieces can be done by means of a bore between two tubes.

More projection planes: An important condition for a design variant is the possibility of being able to accommodate several projection planes. This is needed as a result of the strong eye movements for the display of the ambient and is described in a later paragraph. For this purpose, a second and third grid can be fed in in parallel, which provides for different projection angles.

Depending on the eye orientation the projection unit will then control which plane is used.

Use of MEMS technology: In the case of advanced realization using MEMS technology in the camouflage tubes a complex rod-shaped microsystem (10, 70) will be accommodated, which is produced by MEMS, wafer-level optics and nano-optics printing methods, and which is composed of light conductors (14) with deflecting mirror switches and projection optics (16) as well as control electronics (13).

SV line variant (2)

This variant got its name based on the fine grooves between individual glass bodies, which, however, are not visible in practice through the adhesive bond.

Switchable Mirror: Here the technical basis is a method, which permits to make the layer between two glass bodies reflective or at least partially reflective at high frequency (19). An optical fiber projector (18) positioned at the spectacle rim can thus allow its projection at this mirror surface (21) to be guided in the direction of the pupil. By means of a plurality of such switching mirrors below each another and a corresponding switching, a single projector can generate a plurality of images in succession and from different directions. In this case, a mirror layer extends across the entire width of the glass, so that a plurality of projectors can display the images for one Y-coordinate in parallel. As a result, a light field grid of individual images is formed in front of the eyes. Possible switching mirror methods are:

SV6 Frustrated Total Internal Reflection FTIR: An internal total reflection, or only a frustrated TIR, is generated by extending a gap by means of a PIEZO element that forms the gap by expansion or vibration.

SV8 Electrochromic Mirror:

The system of electrochromic mirrors is used as mirror (electrochromic mirror).

Variants Projector Attachment

PA1: Depending on the degree of miniaturization (3) the computing unit can be mounted directly on the spectacles, or can be designed as a separate unit. In this case the connection can then be designed in a wireless or wire-bound manner PA2: The projector and computing unit can be placed in a unit behind the head.

PA3: The projector and/or computing unit can be placed in a unit in a pocket or belt on the body. The computing unit itself can also be held wirelessly in the handbag or simply in the environment of the user which extends at most 10 meters.

Variants of the Light Field Projection Clipping

The integral light field generates circular projections (50) which overlap. The overlaps have to be cut off during image rendering (clipping) (51).

PB1: The viewing direction is precisely detected by eye tracking and the clipping frames are calculated.

PB2: In addition, the pupil width is detected by the eye tracking camera and the clipping frames are adapted.

PB3: Soft transitions: The edges of the clipping are trimmed slightly transition-free and smoothly, so that the projections match one another with less tolerance.

Coverage Mask Functions

At the front the AR spectacles are provided with a high-resolution darkening LCD display (67) which covers the complete field of view through the spectacle glasses.

Background coverage for non-transparent virtual objects: The main function of the darkening is to render superimposed virtual objects opaque, if required, and thus cover the reality. For this purpose, for each virtual object an associated mask is calculated.

Environment Recognition and Object Recognition

Local AI servers are used for pattern recognition. The environment is scanned with the environment cameras (53) and, as far as possible all objects are assigned to the known logical objects by neural networks (deep learning). In the computer, a digital interpreted world is set up that can be accessed by the user interface. The user interface can then work in an object-related manner Variants of the Camouflage Optics The camouflage optics can be realized in a dense glass medium in various manners. The shape does not have to be exactly a tube, but can also assume more complex forms and nevertheless camouflage consistently, like the following:

TO1 Round shape: The camouflage channel has a perfect cylindrical form (12).

TO2 Oval shape: The camouflage channel has a perfect oval form.

TO3 Shell shape: At the rim of the glass, the camouflage optics has the form of a shell (61), which can be filled by the rim.

TO4 With bend: In addition to their uniform form the shapes are curved in a varying or uniform manner TO5 Whole grid: The shapes are formed into meshes or grids with corresponding branches or intersections.

TO6: Curves at branches: The sharp transitions at branches are softly rounded. The camouflage function is generated by the uniform deflection of the light, which is generated by a plurality of different layers (69) with decreasing optical density around a cavity. These gradient curves can be designed differently:

GR1 Different refractive indices: The layers have different refractive indices that are matched to one another.

GR2 Different dispersion values: The layers have different dispersion values that are matched to one another in order to increase the optical consistency of the camouflage.

GR3 Very thick or thin layers: The layers are designed quite thin or thick.

GR4 Decreasing to an unequal extent: The layers do not decrease uniformly, but exponentially or with varying amount in terms of their density (refractive index) or their thickness.

GR5 Steps or continuously: The layers are applied to one another in a stepped manner, or the layers melt continuously into one another in terms of their density.

Variants of the Camouflage Optics Piercing

In order to project from the interior of the camouflage, it can be necessary to pierce the camouflage jacket (piercing) (69). This can be carried out in various ways:

TP1 Bore: A bore (69) is made at the corresponding points and angles.

TP2 Drilling depth: The correct optical behavior is set by the depth of the bore.

TP3 Drilling form: The behavior is changed by the shape of the bore. The shape can have a spherical, conical, slit, wedge or other form.

TP4 Filling of the bore hole: the drill hole is filled or closed with another optical medium.

TP5 Inner bore: The bores are made at an intermediate stage of the construction of the layers, closed and then the construction is continued. The bore thus acts only from the inside.

Camouflage Optics Layer Structure and Piercing Printing

In order to configure the production of the camouflage optics in a mass-suitable manner, each time an entire grid with a frame is constructed layer by layer. In this case each time one UV-curing polymer layer or another material having a corresponding refractive index is applied. In order to now perform an optical piercing at the projection points of the camouflage tubes, another polymer having a different refractive index is sprayed onto the points using a "bubble jet"-like printer technique. The latter polymer displaces at this point the previously applied layer. The layer is then UV-cured and the next layer is applied. In this case, the sequence of the steps and the printing material can vary.

PD1 Printing before layer application: The piercing points are printed prior to the overall layer application. The printing material can also be an anti-flux agent which prevents the coating from flowing to this point.

PD2 Printing after layer application: The printing is carried out after the overall layer application.

PD3 Doping agent only is printed: Only a substance that changes the refractive index is injected.

PD4 Printing before and after layer application: A combination of pre-and post-printing is carried out, which can also include an intermediate hardening of the layer.

PD5 Further correction prints: Still further points on the layers are printed in order to carry out optical corrections which might otherwise be interfering through the piercing prints.

Variants of the Camouflage Optics Inlays

The inner workings of the camouflage tubes can be designed differently depending on the technology state. The main task is the correct positioning and light guide bending of the projection. At a higher level of technology, the switching and branching can also be accommodated therein. In addition, projection systems as well as recording systems can be installed.

TI1 Structure: A more complex holding structure is fabricated in which the optical fibers are routed and further optical elements are mounted.

TI2 optics inlay: A narrow microchip having wave guides generated by wafer-level optics, deflecting optics and lenses is fabricated, which precisely generates the desired projection point and which provides the lines at the spectacle rim. At the spectacle rim then a narrow IC with MEMS switches and optics is then accommodated, which carries out the distribution of the optical fiber signal onto these lines.

TI3 MEMS board (70): An extremely narrow and long microchip is put into use, which, in addition to electric circuits also integrates many MEMS DMD micro-mirrors as optical switches, as well as optical conductors and lenses. The chip can be mass-produced with IC, MEMS (13) and wafer-level optics (15) technology and can be refined using nano-polymer optical printers.

Description and Variants of the Projection Planes

The light field projection consists of a grid of glass-fiber projectors, which are mounted in the spectacle glass relatively close to the eye. The pupil in the eyeball (58) is located relatively close to the spectacle glass and thus shows a relative strong displacement (71) through the rotation of the relatively large eyeball. This strong eye movement takes place to the right/left and upwards and downwards. The position of the target is therefore strongly dependent on the viewing direction.

This is no problem for a conventional display because a normal screen displays each pixel with a high viewing angle. The light of a screen, even if reflected on a reflective surface of the spectacle glass, shines relatively strong into all directions and illuminates the entire eye region.

Light field fundamentally different: In contrast the individual projections of a light field starting from one point radiate a complete image in the direction of the pupil, like a film projector. This is a fundamentally different principle as to how the image gets to the eyes. The projection angle (74) thence is only limited. Depending on the thickness, the optical fiber only transports a limited-resolution image, which is then brought to the desired exit angle of 20° to 40° (74, 75) at the end of the fiber.

Only because of the relatively wide pupil in the human eye these projection points will form a round image. The exit angle of the projection determines the resolution density of the image.

In order to obtain an image having a resolution that is as high as possible in the area which has just been focused, in the light field the projectors have to provide a particularly small-angled projection in this direction (59). In order to obtain a low-resolution image of the ambient in the non-focused area, in the light field the projectors can provide a wide-angle projection in this direction (60), so that the projections can be used for the largest possible angles of view of the pupil. Because of these partially small projection angles, the light field has to be precisely matched to the eye movements of the eyeball.

These circumstances also are the reason for the need to use at least two complete projection field planes in parallel:

One plane for the focused regions (47), and one for the imaging of the remaining unfocused ambient (46).

Through the technique of the optical switches located directly at the projection points in MEMS technology and optimum light guides in wafer-level optics methods, there is no limit to the number of projection points used for different resolutions. The number of optical fibers to be routed is extremely reduced and thus the bundle is very thin. By contrast, the individual fibers can be much thicker and can resolve higher.

Variants of Reduction of Field of View Resolution

The theoretical pixel resolution for high resolution AR spectacles that cover the whole field of view easily reaches 20 to 40 megapixels. Luckily, however, an AR hologram projection in practical use differs fundamentally from a classical image projector or monitor.

AR 1 Only objects that are present: In augmented reality, almost never the entire field of view is completely covered with virtual objects. In most cases, only a few scattered objects (46) are mixed into the reality.

AR 2 Only focused area HQ: A second aspect of the practical AR is the fact that a human can always only look at one point and only at that point perceives the details in a highly resolved and focused manner (47). The entire remaining ambient is perceived in a much lower resolution (45). By the eye tracking an AR hologram projector is always aware exactly where to and into which depth the eye is looking. With this information, the projector only needs to project a very small section at the highest resolution. The remaining projectors can simply resolve less with a much smaller number of image cycles. Again this results in enormous image rate savings. The types of resolution reduction can be used for the ambient in the form of a lower image frequency, pixel resolution, color depth and focusability.

AR 3 Lower frame rate in the focus area: A third aspect is that the repetition rate for focused relatively still objects needs to be much less than for fast moving objects. The human eye perceives flicker only in the periphery and is quite slow in the focused area (47).

Technically, the repetition rate can thus be reduced in the focused area and, when the movement is fast, the resolution can be slightly reduced.

AR 4 Focus adjustment only in the focus area: The possibility of the actual focusing on the objects only needs to be enabled in the focus area.

Matrix Hologram and Hybrid Projectors (35)

A1 Matrix projector: The transformation matrix TM is not carried out optically by means of a transformation hologram, but is applied to the image purely computational in the computer. The SLM is used in an orthodox manner to place this image in front of the optical fiber ends. Thus one saves the complexity of the computer-generated holograms and only needs a SLM optimized therefor and having an illumination system (83).

B1 Hybrid projector: A normal pixel grid of an orthodoxly used SLM is used as the image. For the application of the optical fiber transformation matrix, however, a second SLM surface is used as the CGH and therewith a genuine hologram is projected in front of the eyes (76, 77). This is the most simple implementation which can be realized, because for the CGH (computer generated holographic) only little extra computing power and know-how has to be used (78, 79).

B2 Hybrid projector: The same procedure as in B1, however one does not dispense with the eye focusing of the objects. In this case, the second SLM does not only transform the TM for the optical fiber, but additionally transforms the imaging depth of the individual pixels. The information for this is taken from the Z buffer of the preceding calculated 2D image.

C1 Hologram projector: Where in the B variants an image is still calculated directly from pixels using traditional OpenGL methods, the image calculations of the C variants can directly generate the hologram data, i.e. the interference patterns, which are then transmitted to the SLM, from the models. Only after the SLM has been irradiated with the correspondingly modulated RGB color component lasers the coupling-in light front is generated. A single SLM can be used (82) to perform the imaging and the optical fiber transformation in one step. For this purpose, however, either the transformations have to be multiplied or the hologram (84) has to be calculated at a high frequency.

Light Sources and Speckles Reduction

E1 reduced coherence: The laser light source is modulated in a mixed manner in one or more different aspects, to an extent that is still tolerable for the holographic method.

1. The light wavelength is thus modulated into a correspondingly limited mixed spectrum.

2. The phases are uniformly mixed in terms of their displacement (moving diffusers or multimode fiber).

3. The angle of the beams with respect to one another (the parallelism) is mixed in a correspondingly limited scope.

These modulations can be achieved by moving diffusers, piezoelectric benders, acousto-optical modulators or passive transmission through multimode optical fibers.

E3 Optical fiber transmission: The passage of the wave front through a multimode optical fiber to the pupil, which characterizes this system, effects a coherence phase mixing which greatly suppresses a speckle formation.

E4 Constant hologram variation: If a diffraction pattern generation method is used for the image content which permits to use a plurality of different ways to achieve the same result, then the generation of the images can perpetually use other pattern variants. A random generator can select the respective next variant. The speckle patterns would always appear only in one cycle, while the desired images remain in each cycle.

E5 Piezo displacement: The coherence is reduced by means of piezo-vibrating mirrors or diffusers.

Splitting Field, Description and Variants

The AR spectacle is based on a dense grid of optical fiber projection points that are located near the eyes and in front of them. The larger the active field of view of a maximum sensible 220 degrees horizontally and the higher the virtual point resolution required for this, the more optical fiber ends are used. Depending on the number of SLM projectors used and depending on the used holographic parallel use of the projectors, however, from these optical fibers only a few (2-32) are used in parallel. Also these optical fibers have to be selected with high frequency. The abstract basis for this is the optical switch, and ultimately a mix of different forms of switches is used.

Coupling-in field as a first switch stage: In the AR spectacles in addition to the process of coupling-in the images into the fiber ends, the coupling-in field also performs the function of selecting the fiber ends. In the hologram projection, this selection is already taken into consideration during the image calculation, and is thus very effective, but deeply integrated into the calculation methods. Due to the largest possible optics per fiber, however, the coupling-in field (28) is limited in the number of selectable fibers.

Second switch stage: The optical fibers from the coupling-in field can be branched on their way to the projection exit points in various ways, in order to reach the final number of projections that are needed. This can be done by means of single switches and a tree structure. Switches having a plurality of branches, however, can also be used.

Active switch: Best are active switches which completely branch off the luminous flux. Some techniques, however, accomplish only barely 100% the residual light being either tolerable or having to be blocked by an additional blocking layer.

MEMS technology: In the MEMS fabrication technique, the scheme can still be optimized to such an extent, that the number of laid fibers can also be greatly reduced. This is achieved by displacing the switches to shortly before the exit points.

Switch and angle: Due to the particularly small structural shape of the MEMS or micro-optics, a combination of an active switch and a 90 degrees deflection can be provided directly in the camouflage tube (16). As a result, it is possible to "kill two birds with one stone", because the 90 degree deflection is also a critical point. Due to the massive saving of optical fibers, the fibers can be made much thicker and thereby conduct much more highly resolved images.

Combination of ambient and focus fibers: If the optical fibers are massively consolidated, there exists also the possibility to join the optical fibers for focus and ambient projectors. Namely, these types of projectors differ only in the input optics and the exit optics. The more complex coupling-in optics for focus projectors can also be used for simpler ambient projectors.

Fiber assembly: For joining focus and ambient projectors, the two optical fibers can also merge into one.

Switch techniques: Various physical methods can be used to set the switches:

WT1 piezo-actuators: Optics are physically displaced relative to one another. Thus, with piezo-actuators whole fields can be largely displaced.

WT2 FLCD: The selection can be carried out by simply opening and closing FLCD diaphragms (27).

WT3 FTIR: Adjustable frustrated or full internal total reflection FTIR.

WT4 Electrochromic mirror: Switching with electrochromic layers.

WT5 MEMS: Micromechanical rotation, lowering or shifting of mirrors or other elements.

WT6 DMD: Tilting of DMD mirrors (16) as a whole field or as a large mirror. Switch trees: By combining a plurality of switch systems, many branches can be realized.

WB1 cascading points: One switch type can be connected in series many times in order to have many branches on one strand (10). This is particularly effective if the switch type can provide for the onward transmission of the signals at one switch end particularly effectively.

WB2 tree branching: All the switch ends are branched further.

Special Switch Forms in the Camouflage Tube Inlay

In the AR spectacles the last switches can be mounted in a cascade-like manner on the camouflage tube inlays, which are produced in MEMS and/or wafer-level optics technology (10). The projection optics can additionally be refined using nano-gradient polymer printers based on UV curing. In addition the switch can execute an approximately 90 degree rotation. The following design variants are advantageous for this purpose:

DMD Mirrors with Coupling-Out and Re-Coupling-In Optics:

The switch function is carried out by one large DMD mirror or a grid of DMD mirrors. The mirrors can be tilted into different positions. One single mirror can have a focusing shell shape, or the mirror array can also carry out a desired focusing.

Depending on the tilting direction, the focusing can be different. The coupling-out can be used directly through its focusing property, or can be used as a final projection via a further optics. The control of the mirrors does not need to be carried out individually, but can be carried out only for all of the mirrors together.

During the transmission, the wave front is guided back into a coupling-in optics. By expansion and larger waveguides in the system, the wave front can be trimmed less steeply. The wave front can be directed onto the DMDs by means of a steep total reflection mirror. The coupled-out wave front, on the other hand, can pass through the mirror due to the steeper angle.

Refined Optical Fiber Tip

By the use of nano-optical polymer printers the ends of the optical fibers can be provided with a fine lens optics. The printers can also print gradient optics and expand and design the opening of the fiber in a way not to disturb the complex light wave flux and thus increases the resolution capacity of the overall system which is restricted by the size of the opening. In this case, it is not necessary to pay attention to the geometry retention, since the geometry is restored by the transmission matrix.

Hologram-Optimized FLCOS and DMD Systems

The known SLM systems have been developed primarily for normal video projection. They are also well suited for CGH applications. Nevertheless, for the AR spectacles the SLM system should be optimized for the CGH and the coupling-in of the optical fibers, since only a single perspective is used from the wave front and the remainder, unlike in the case of a normal projector, is irrelevant.

KF2 Complexly modulating FLCOS SLM

In order to achieve an amplitude and phase modulation that is independently adjustable, two thick FLCD layers are used, which can rotate the polarization in the opposite directions, respectively. A phase modulation only can thus be achieved by means of an equally strong activation of both layers. In this case, the polarization of the light is first rotated in one direction and then rotated back again exactly. At the end the polarization remains the same. Only the refractive index of the two layers, and thus the phase shift, varies depending on the strength of the activation.

An activation of the two layers with different strength additionally generates a rotation of the polarization and thus an amplitude modulation.

KD2 various light sources

By using various light sources from different directions, with a corresponding combination of the light sources many different amplitude intensities can be generated.

The various light sources can also provide for different phase shifts in order to generate coupling-in patterns with different phases.

KD3 Binary phase modulating MEMS SLM

A simplified variation allows the micro-mirror to switch only between two phase shift positions, such as 0 and $\pi$ of the wavelength used. As the third state, the mirror can be completely tilted away in order to additionally function as a binary amplitude modulator.

CM1 Micro-mirrors tilting in multiple directions: The mirrors can tilt not only in two directions but in more directions, in order to obtain even more different phases or amplitudes from the illumination light front.

The invention claimed is:

1. Augmented reality (AR) spectacles for mixing virtual images into an image that is visible for a wearer of the spectacles through at least one spectacle glass, wherein a plurality of optical fiber projectors made of multimode optical fibers project a virtual image with a large depth of field into at least one eye of the spectacle wearer, wherein the virtual image is an integral image (integral imaging) of a grid of individual projections arranged besides one another and above one another, which, when viewed from close proximity, for the spectacle wearer merge into an overall projection, wherein each of the individual projections is a section of the virtual image, wherein at an entry end of each optical fiber a computer-controlled Spatial Light Modulator (SLM) or another imaging system is mounted, for which a computer calculates a complex pixel pattern, which is determined by the transformation of the original image through a transmission matrix of the optical fiber, wherein an optics couples a wave front supplied by the spatial light modulator (SLM) as a hologram or as a complex projection with amplitudes and relative phase shifts into the optical fiber, and wherein at an exit end of each optical fiber a further optical system can be provided in order to project the original image emitted from the optical fiber into the eye of the spectacle wearer.

2. Augmented reality (AR) spectacles according to claim 1, wherein the optical fiber projectors or adjoining extending micro-optical systems are routed through camouflage channels in the spectacle glass directly to an optimum position for the integral image grid, wherein a gradient optics deflects light that passes through the spectacle glass around the channels and makes the channels invisible from the outside, and wherein the gradient of the refractive index of an optical medium of the gradient optics decreases in the direction of the channels from the surrounding high index to a lower index.

3. Augmented reality (AR) spectacles according to claim 2, wherein entire micro-optical systems are hidden in the camouflage channels, which additionally integrate Integrated Circuit (IC) switching logics, and/or Micro-Electro-Mechanical Systems (MEMS) micro-mechanics or Digital Micromirror Device (DMD) mirror fields and/or 3D-printed gradient micro-optics.

4. Augmented reality (AR) spectacles according to claim 1, wherein a plurality of optical fiber projector ends are positioned around a rim of a spectacle glass and are directed from there into the spectacle glass, and wherein the spectacle glass is provided with a plurality of rapidly switchable mirror surfaces located besides one another and above one another, which, when they are switched to be reflective, deflect the projection and direct it out of the spectacle glass onto the eye.

5. Augmented reality (AR) spectacles according to claim 1, wherein projection points of the integral image are positioned in at least two grid planes in parallel, different exit optics, different exit angles and thereby different resolutions being provided for each plane.

6. Augmented reality (AR) spectacles according to claim 1, wherein overlaps of the individual projections arranged besides one another and above one another can be trimmed in a resolution-efficient manner matching each other by choosing the distances of the integral projection points from one another in relation to an optimum or minimum pupil size of the spectacle wearer, and/or wherein exit optics of the projection points are formed in such a way, that the projection generates an effective useful square shape, and wherein at least one eye camera is provided, which measures the size of the pupils.

7. Augmented reality (AR) spectacles according to claim 1, wherein at least one SLM is mounted outside the field of view, wherein the SLM is illuminated by at least one light source, wherein a light front generated by the SLM incides onto a further SLM surface or directly onto a coupling-in optics, wherein at least one optical fiber with a preceding coupling-in optics is placed in a coupling-in field, and wherein the fiber is guided through the spectacle ear piece or on another path to the spectacle glass, where the projection exit point, which may have further optics, or light guide extensions with optical switches and micro-optics, or whole chip systems with IC logic and MEMS elements in the form of switches and micro-optics, is positioned in at least one point.

8. Augmented reality (AR) spectacles according to claim 7, wherein the coherence of the light source is reduced by mounting optical fibers for the transmission of light and/or wherein vibrating piezo-electrically moved mirrors or diffusers are used.

9. Augmented reality (AR) spectacles according to claim 7, wherein behind the coupling-in field active optical fiber single switches or successively switching switch systems enable the control of the projection points, which are switched by MEMS elements, or by means of DMD mirrors or electrochromic mirror or piezo actuators.

10. Augmented reality (AR) spectacles according to claim 1, wherein a DMD chip SLM optimized for AR optical fiber projection is used for the utilization of multiple or complex light sources, which can tilt or adjust a plurality of micro-mirrors on the DMD chip in additional directions and positions respectively, and/or has various additional mirror or diffraction structures on the individual mirrors, in order to use different light sources from different directions for the projection.

11. Augmented reality (AR) spectacles according to claim 1, wherein in a Ferroelectric Liquid Crystal on Silicon (FLCOS) SLM optimized for AR optical fiber projection the mirrors located thereon comprise a plurality of independently adjustable Ferroelectric Liquid Crystal Display (FLCD) layers in order to independently set grey values and phase shifts.

12. Augmented reality (AR) spectacles according to claim 1, wherein a coupling-in field having a plurality of coupling-in optics is used as the first stage like an optical fiber multi-switch, wherein in a holographic projector holograms themselves can control the respective coupling-in optic, whereas the optical fibers that are not in use can be closed by preceding FLCD diaphragms or other diaphragms.

13. Augmented reality (AR) spectacles according to claim 12, wherein behind the coupling-in field active optical fiber single switches or successively switching switch systems enable the control of the projection points, which are switched by MEMS elements, or by means of DMD mirrors or electrochromic mirror or piezo actuators.

14. Augmented reality (AR) spectacles according to claim 1, wherein a gradient index fiber enlargement or constriction is mounted on the optical fiber ends for the entry and exit of the wave fronts, which makes it possible to generate a higher resolution or better point light sources.

* * * * *